US012164765B1

United States Patent
Ramanathan et al.

(10) Patent No.: US 12,164,765 B1
(45) Date of Patent: Dec. 10, 2024

(54) HOTKEY TRAINER FOR SCREEN READER APPLICATIONS

(71) Applicant: Freedom Scientific, Inc., Clearwater, FL (US)

(72) Inventors: Sriram M. Ramanathan, Safety Harbor, FL (US); Sumanth Aluri, Jacksonville, FL (US); Mariana Viso, Hialeah, FL (US); Erynne Dorothy San Antonio, Port Orange, FL (US); Ryan Aponte, Pittsburgh, PA (US)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

(21) Appl. No.: 18/303,239

(22) Filed: Apr. 19, 2023

Related U.S. Application Data

(60) Provisional application No. 63/332,327, filed on Apr. 19, 2022.

(51) Int. Cl.
*G06F 3/0489* (2022.01)
*G06F 3/04895* (2022.01)

(52) U.S. Cl.
CPC .............. *G06F 3/04895* (2013.01)

(58) Field of Classification Search
None
See application file for complete search history.

(56) References Cited

U.S. PATENT DOCUMENTS

| | | | |
|---|---|---|---|
| 7,673,241 B2 * | 3/2010 | Sun | G09B 21/006 715/810 |
| 9,547,823 B2 | 1/2017 | Hu et al. | |
| 10,185,917 B2 | 1/2019 | Greystroke et al. | |
| 11,106,741 B2 | 8/2021 | Kleiman-Weiner et al. | |
| 2003/0048311 A1 * | 3/2003 | Wen | G06F 3/04895 715/835 |
| 2007/0162875 A1 * | 7/2007 | Paquette | G06F 3/0238 715/847 |
| 2008/0072155 A1 * | 3/2008 | Detweiler | G06F 3/0489 715/810 |
| 2008/0243908 A1 * | 10/2008 | Aasman | G06F 16/28 707/999.102 |
| 2011/0179390 A1 * | 7/2011 | Morris | G06F 3/0482 715/854 |
| 2014/0280363 A1 * | 9/2014 | Heng | G06F 16/185 707/802 |

(Continued)

OTHER PUBLICATIONS

Doug Lee, JAWS Alert Manager (JAM), Last revised Jun. 2022, Last accessed May 5, 2023, https://dlee.org/jam/.

(Continued)

*Primary Examiner* — Mandrita Brahmachari
(74) *Attorney, Agent, or Firm* — Dennemeyer & Associates LLC

(57) ABSTRACT

A system and method of digitally monitoring actions of a user on a computing device and providing real-time suggestions to aid the user's task performance. The digital nudging software may perform a range of subtasks successfully. The subtasks may include loading and processing the structured representation of an application to build the graph, identifying the starting point ("Point A") and the end point ("Point B") of the path of the user, and conveying a notification of the faster paths in a user-friendly format.

12 Claims, 8 Drawing Sheets

(56) References Cited

U.S. PATENT DOCUMENTS

| | | | |
|---|---|---|---|
| 2017/0221240 A1* | 8/2017 | Stetson | .............. G06T 11/206 |
| 2018/0165694 A1 | 6/2018 | Galkin et al. | |
| 2019/0156702 A1* | 5/2019 | Sannidhanam | ......... G06F 16/26 |
| 2020/0065867 A1 | 2/2020 | Lim et al. | |

OTHER PUBLICATIONS

Weinmann et al., Digital Nudging, Business & Information Systems Engineering, 58(6), 433-436.

Mele et al., Smart nudging: How cognitive technologies enable choice architectures for value co-creation, Journal of Business Research, vol. 129, 2021, pp. 949-960.

* cited by examiner

HOTKEY TRAINER FOR SCREEN READER APPLICATIONS

PRIORITY CLAIM

This non-provisional patent application claims priority to U.S. Provisional Patent Application Ser. No. 63/332,327 filed Apr. 19, 2022, and entitled "Hotkey Trainer for Software Applications."

BACKGROUND OF THE INVENTION

1. Field of the Invention

This invention relates, generally, to user-interface activity. More specifically, it relates to a system and method of digitally monitoring actions of a user on a computing device and providing real-time suggestions in order to aid the user's task performance.

2. Brief Description of the Prior Art

Increasing numbers of people are relying on computing devices and their applications to make everyday decisions. Therefore, application and computing device operating system designers have become the architects that influence people's decisions. Whether through convenience, hotkeys, or suggestions to increase efficiency, user interface designers have begun influencing users through digital nudging (Weinmann, M., Schneider, C., & von Brocke, J. (2016). Digital nudging. Business & information Systems Engineering, 58(6), 433-436). In this manner, the form of digital nudging used by application designers entails "the use of user interface design elements to guide people's choices or influence users' inputs in online decision environments" (Weinmann et al., 2016, p. 433). Digital choice environments include user interfaces, such as web-based forms and screens that require people to make judgments or decisions. Therefore, an effective nudge reflects the digital context in which people approach problem solving, the biases people bring to the situation, and how people interact or cooperate within a wider group.

However, not all applications are designed equally and are readily available for all users. Screen readers (e.g., JAWS) are the gateway to computing device operating systems and its applications for users who are visually impaired. It vocalizes the screen content and even presents additional non-visual navigation mechanics. These types of systems are exclusively driven by keyboard hotkeys, which are used to invoke its navigation mechanics and vocalization commands. Using keyboard hotkeys, screen readers are able to provide faster and more efficient navigation. However, due to the extensive catalog of hotkeys, along with the inaccessibility to this vast catalog, inexperienced users (young users or users who have recently become visually impaired) often become accustomed to using rudimentary commands, and only know a handful of hotkeys. Because of the lack of hotkey utilizations, inexperienced users are forced to spend substantially more time navigating through applications, impacting their performance on a computing device.

For example, sighted users commonly use two predominate hotkey methods to reach the end of a document in most computing device applications (e.g., Microsoft Word). The first is to press the key "Page Down" (hereinafter "PgDn") repeatedly. The second is to press and/or hold the keys "CTRL"+"PgDn." These hotkey methods are used throughout computing device applications, including but not limited to Internet Browsers (e.g., MICROSOFT EDGE, GOOGLE CHROME, or FIREFOX), additionally they are extremely helpful when navigation large PDF files in PDF reading applications (e.g., ADOBE DC).

However, the repeated hotkey use is not just limited to sighted users. As previously stated, visually impaired users (hereinafter "screen reader users") may only know a few hotkey methods, like the example above, increasing the navigation time of a user through the computing device application. For example, a screen reader user navigates a web page using virtual cursor commands for more efficient navigation. While the screen reader user is able to jump through page heading using the 'h' keystroke, or even navigate to specific buttons using the 'b' or the 'shift'+'b' command, they may be unaware of these button commands. The screen reader users instead will instead simply use the down arrow or up arrow to reach their end destination, forcing the screen reader user to spend more time navigating the web page, increasing inefficiency.

Recent advances in digital nudging systems and methods have enabled the use of graph based data structures to categorize interactions of a user on the computing device or within the application. A graph based data structure represents a network of real-world entities and illustrates a relationship between them. Usually, the graph-based data structure is typically made up of datasets from various sources and provides structure to a diverse dataset. However, currently known digital nudging systems and methods using this technology-such as the ones disclosed in U.S. Pat. No. 9,547,823 (issued Jan. 17, 2017) or U.S. Pat. No. 11,106,741 (issued Aug. 31, 2021)—are limited to the recommendation or nudging they provide to a user. This type of digital nudging provides a recommendation to specific media content based on the user's past browsing, experiences, or clicking, or provides a recommendation to specific documents or related documents either by request or automatically based on the search input of the user. Accordingly, applications of such digital nudging are limited in their recommendations and are unable to provide adequate recommendations to help navigate a specific application, computing device operating system, or web browser. Additionally, the applications of such digital nudging are unable to provide these recommendations to screen reader users, in any facet, as they require a notification to appear on a screen to provide the recommendation. Thus, currently known digital nudging systems and methods implementing a graph-based data structure are incapable of providing real-time recommendations to the user to increase the user's navigation efficiency within a specific application, computing device, or web browser.

Another type of currently known digital nudging systems and methods, include the use of artificial intelligence ("AI"). However, although there has been considerable progress in developing automatic approaches to assisting decision making, the use of advanced machine learning algorithms to perform fully automated real-time suggestions and nudging for non-streaming/non-social media computing device applications is limited (Cristina Mele, Tiziana Russo Spena, Valtteri Kaartemo, Maria Luisa Marzullo, "Smart nudging: How cognitive technologies enable choice architectures for value co-creation", Journal of Business Research, Volume 129, 2021, Pages 949-960, ISSN 0148-2963). Accordingly, currently known machine learning digital nudging systems and methods—such as the ones disclosed in U.S. Pub. No. 2018/0165694 (published Jun. 14, 2018), U.S. Pat. No. 10,185,917 (published Jan. 22, 2019), or U.S. Pub. No 2020/0065867 (published. Feb. 27, 2020)—require that a visually capable user receive the notification from the currently known machine. These currently known machine learning digital nudging systems and methods do not provide any benefit for the screen reader user in navigating computing device operating systems or applications. Of note, many times these currently known machine learning digital nudging systems also require enormous computational resources once the problem goes beyond a certain data size (e.g., gigabytes). The currently known machine learning digital nudging systems do not have the processing power or digital space to effectively function for a visually impaired user ("screen reader user"), as they are required to either replicate or integrate with the screen reader technology to provide the screen reader user with the beneficial suggestion. Accordingly, providing a notification specifically for the screen reader user would be extremely difficult and inefficient for the currently known machine learning digital nudging systems, therefore, the systems and methods are incapable of offering real-time suggestions and help for screen reader users.

Accordingly, what is needed is a system and method of digitally monitoring actions of a user on a computing device and providing real-time suggestions to aid the user's task performance. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in several technical areas. Therefore, the claimed invention should not necessarily be construed as limited to addressing any of the problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for efficiently monitoring actions (hereinafter "events") of a user on a computing device and providing real-time suggestions to aid the user's task performance is now met by a new, useful, and nonobvious invention. In an embodiment, the present disclosure may include a time-based user intent and application graphing through a programming server. The programming server may comprise an adaptable general format, such that the programming server may be able to model the formatting of all the applications of the computing device, enabling scalability for all application interactions on the computing device.

In addition, by using the standard programming server, the digital nudging software may easily access the information of each application in a linearly organized manner, similar to how a screen reader organizes information for the screen reader user. The information collected may then be mapped as a graph to represent the path of the user navigating the application. For example, a paragraph of a word processing application (e.g., WORD, ADOBE DC, or GOOGLE) can be a node on the graph and the screen reader shortcut "p" would be an edge that connects all paragraph nodes, thus denoting the path a user can take in jumping between paragraphs.

In an embodiment, the digital nudging software may represent the application as a graph and monitor the path the user takes to navigate through it. The user's path can then be compared to the optimal path and a suggestion can be made if necessary. In some embodiments, the digital nudging software may represent the application through a machine learning hotkey algorithm. In this manner, the digital nudging software can automatically compare the hotkeys used by the user as compared to the hotkeys that would represent the shortest path to the same endpoint, and automatically provide a notification to the user, suggesting the use of the calculated hotkeys.

Further, in an embodiment, the digital nudging software may be configured to determine when the user is acting sub-optimally and provide a notification to the user, along with an application extension. The application extension emulates the screen reader hotkey behavior and has a keystroke pipe (hereinafter "hotkey pipe") that sends data to the programming server. The programming server may have two main subsystems. The first is a graphing component, which maps the application into a graph, and the second is the path comparator which may be used to determine when a user is acting sub optimally.

Therefore, the digital nudging software can detect when the user did not use optimal hotkey to reach to the endpoint and subsequently provide the user with a notification to use the optimal hotkey. In some embodiments, for the screen reader user, the notification may be provided the background of the computing device operating system, in order not to inhibit the activity of the screen reader user within the application. Additionally, the notification may be available as an audible message, such that the notification alerts the screen reader user to an optimal navigation path for the application. In some embodiments, the notification may inform the screen reader user of the inefficient event and provide the screen reader user with an analysis on how the screen reader user could have performed the event more efficiently.

The digital nudging software may further include a graph-based approach, such that the graph may be used to represent the path of the user within an application. Moreover, the digital nudging software may further include the screen reader software and specified hotkeys. In some embodiments, the digital nudging software may have a screen reader emulator, such that the digital nudging software is configured to replicate the screen reader hotkeys and events.

In some embodiments, the digital nudging software may be required to perform a range of sub tasks successfully before it is allowed to provide the notification to the user. The subtasks may include loading and processing the structured representation of an application to build the graph, identifying the starting point ("Point A") and the end point ("Point B") of the path of the user, and conveying a notification of the faster paths in a user-friendly format.

The screen reader system is designed to assist blind and low vision users in interacting with software applications more efficiently. It is comprised of several key components that work together to monitor, analyze, and recommend improved keyboard combinations for navigation within the application.

The monitoring module tracks user interactions with the software application in real-time, focusing on events that are executable by keyboard combinations. The processing module then processes these interactions and establishes starting and ending points for navigation within the software application. By utilizing a graph-based approach, where nodes represent user interface elements and edges represent keyboard combinations, the processing module identifies one or more preexisting keyboard combinations that allow the user to complete the same navigation tasks with fewer interactions.

The notification module generates a notification indicium recommending these more efficient keyboard combinations to the end user. This notification can be presented in various formats such as audio, Braille, a visual overlay, or a combination thereof, depending on the user's needs and preferences. The input module is responsible for receiving and interpreting user input from a variety of devices, including keyboards, touchscreens, mice, touchpads, microphones, and Braille notetakers. Once the user input is processed, the communication module transmits the notification indicium to an output device for presentation to the end user.

The system employs a Gaussian distribution module to store end user interactions with each user interface element as a function of time. This information is then used to weight the graph, helping to resolve the starting point and the ending point for navigation through the user interface. The screen reader system is initialized with a default Gaussian distribution that is updated based on past usage by the end user.

Additionally, the notification module is configured to adapt the format and content of the notification indicium based on user preferences, device capabilities, or context. It can also provide incremental guidance related to the more efficient keyboard combinations upon user request.

A computer-implemented method for improving end-user efficiency is also included in the screen reader system. This method involves monitoring keystrokes, analyzing them using graph-based techniques, generating nudge notifications that suggest more efficient keystroke combinations, presenting these notifications to the user, receiving user input, adjusting the user's interaction based on their response to the nudge notification, and iteratively refining efficiency improvement recommendations by monitoring subsequent user interactions and updating the graph accordingly.

The digital nudging system operates alongside the screen reader system, featuring components such as a programming server, graph module, end-action detector, comparator module, and notification system. The system generates a graph representation of the application, listens for focus change events, records the user's navigation path, and identifies the end point using an adaptive threshold based on Gaussian distribution. It then compares the user's navigation path with the shortest path between the starting and ending points and provides suggestions for optimized navigation paths if the calculated path is shorter than the user's recorded navigation path. These suggestions are presented the next time the user arrives at the starting point in the application. The Gaussian distribution and adaptive threshold are updated based on the user's interaction with the application and recorded timestamps at each navigation arrival.

Additional aspects and advantages of the present disclosure will become readily apparent to those skilled in the art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
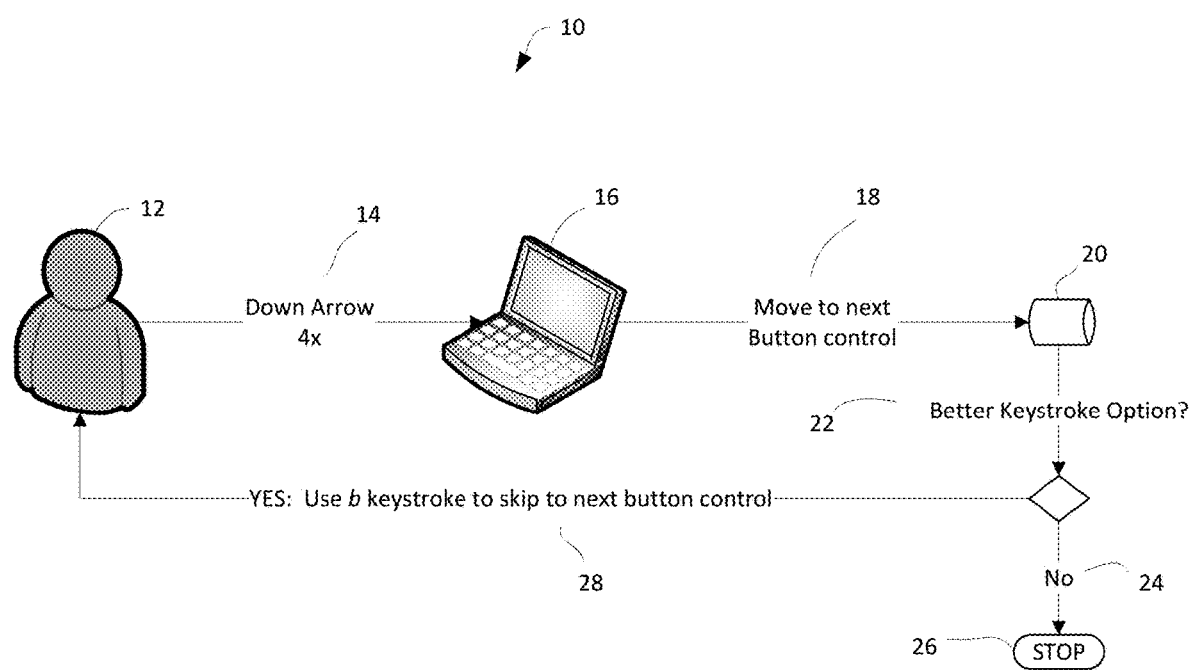
FIG. 1 illustrates an exemplary configuration in which a digital nudging system is connected to a user and a computing device, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings used herein are for organizational purposes only and shall not be used to limit the scope of the description or the claims. Furthermore, the use of certain terms in various places in the specification of for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth to provide a thorough understanding of embodiments of the present technology. It will be apparent, however, to one skilled in the art that embodiments of the present technology may be practiced without some of these specific details. The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The present disclosure pertains to digital nudging software and the method of digitally monitoring actions of a user on a computing device and providing real-time suggestions to aid the user's task performance. In an embodiment, the main function of the digital nudging software may be to prompt the user with keyboard shortcuts within a specific threshold of inefficient attempts to reduce navigation time of a user within a specific application.

In an embodiment, the main structure of the digital nudging software may have implemented time-based user intent and application graphing through a programming server. In some embodiments, the programming server may be any programming server known in the art, including but not limited to, C++, C, Java, or Python. In this embodiment, the programming server has a general format used by all applications, which enables scalability for all application interactions on the computer. Using the programming server, the information of each application may be accessed in a linearly organized manner, like how a screen reader organizes information for the user. Additionally, in some embodiments, the information of each application may be mapped as a graph to represent the path of the user took navigating the application. In some embodiments, a paragraph may represent a node on the graph, while a screen reader (e.g., JAWS) shortcut may represent an edge that connects all paragraph nodes, denoting the path a user can take as they switch between paragraphs of the application.

In an embodiment, the present disclosure may be able to graph multiple screen reader shortcuts, identifying the user's end location on the application through a time-based intent recognition. Based on the graphs, in some embodiments, the present disclosure may then recommend the appropriate application hotkey. In some embodiments, the recommendation notification may be altered based on user preference. Accordingly, the recommendation may appear in the background notification, provided information on how the user would interact with the digital nudging software. Additionally, in some embodiments, the recommendation may be sent at the end of a workday or standard day.

FIG. 1 depicts an exemplary configuration in which the digital nudging system 10 is connected to a user 12 and a computing device 16, according to an embodiment of the present disclosure. In an embodiment, when a suboptimal action 14 is detected for a task 18, the digital nudging system 10 may notify the user with steps 28 to correct it, provided specific conditions are met. In the example of FIG. 1, user 12 uses the keystroke command down arrow four times (4$x$) to skip down to a desired button control. Task 18 is forwarded to module 20 which determines if there are more efficient keystroke options 22. This may be resolved in various priorities. A priority would be reducing the KEY-DOWN or KEYPRESS events needed to achieve task 18. Another priority would be to minimize the number of combination keystrokes (e.g., avoid having to simultaneously depress multiple keys). These priorities may be quantified as values wherein the minimal value is optimal because it requires the least interface interaction by the user. The task (or "end-point") is identified by factors including firing an event on the button control (e.g., a "click" event), time elapsed on the control and/or a history of repeatedly landing on the same button control. In JAWS, the screen reader developed by Freedom Scientific, a user may navigate between buttons on a web page using the "B" key. Pressing "B" will move the user to the next button and pressing "Shift+B" will move the user to the previous button. For task 18, the system determines there is a better keystroke option and nudges 28 the user to use the keystroke "B" as a single keystroke to achieve task 18 instead of using the down-arrow key four times to achieve exactly the same outcome.

In some embodiment, the digital nudging software may verbalize the notification for the screen reader user. Additionally, the notification provided to the user through the digital nudging software is in real-time. In some embodiments, the notification provided to the user may be sent at designated times including, but not limited to, a user-specified time, the beginning of the workday, the end of the workday, the beginning of the standard day, or the end of the standard day.

Moreover, digital nudging software may run in the background of the computing device. In an embodiment, when the screen reader is activated on the computing device, the digital nudging software may implement a button at the top of the application to generate the real-time graph and its relationship to the screen reader hotkeys. In some embodiments, the application may be programmed using similar programming structures and language from across the computing device, such that graphing may be scalable and adaptable to the screen reader.

Figure 2:
FIG. 2 is a screenshot of what a graph-based data structure extension looks like when running on a simple application crafted for testing.

FIG. 2 depicts a screenshot 30 of what a graph based data structure extension looks like when running on a simple application crafted for testing, according to an embodiment of the present disclosure. In an embodiment, the graphing button 32 of the digital nudging software may be located on the front screen of the application. Accordingly, when a user interacts with the graphing button 32, a real-time graph is provided to the user. In addition, the real-time graph may be beneficial for debugging the digital nudging software. In some embodiment, the screen reader hotkeys may be implemented within the digital nudging software in order to provide a real-time graph on the use of screen reader hotkeys by a screen reader user. JAWS screen reader offers numerous hotkeys for easy navigation and accessibility through the web page illustrated in FIG. 2. These include:
1) Arrow keys: Navigate through text, links, and form elements on a web page.
2) Tab: Move forward through links, form elements, and buttons.
3) Shift+Tab: Move backward through links, form elements, and buttons.
4) H: Move to the next heading.
5) Shift+H: Move to the previous heading.
6) 1-6: Move to the next heading of a specific level (e.g., pressing "2" will move to the next level 2 heading).
7) Shift+1-6: Move to the previous heading of a specific level.
8) B: Move to the next button.
9) Shift+B: Move to the previous button.
10) L: Move to the next list.
11) Shift+L: Move to the previous list.
12) I: Move to the next list item.
13) Shift+I: Move to the previous list item.
14) T: Move to the next table.
15) Shift+T: Move to the previous table.
16) Ctrl+Home: Move to the beginning of the page.
17) Ctrl+End: Move to the end of the page.

Displayed in FIG. 2 are first H1 heading 34, first DIV text 36, upload button control 38, first button control 40, second H1 heading 42, second DIV text 44, slider control 46, second button control 48, third H1 stylized heading 50, third DIV text 52, first H2 heading 54, image 56, list 58, fourth DIV text 60 and first H6 heading 62. For example, a new screen reader user may know there is a list of reasons why dogs are great on the page. However, as they cannot "see" where that list is, they must navigate to it with audio and/or Braille feedback. If the new screen reader is only using the down arrow key it may take approximately thirteen (13) keystrokes to find the list. Upon each keystroke, they would wait for feedback from the audio/Braille to orient themselves on the page. Their starting point is first H1 heading 34 and the ending point is list 58. Each navigable element on the page is a node in the graph and the edges are the keystrokes. From first H1 heading 34 to list 58 there are numerous possible paths for the new screen reader user to take. However, the shortest path is likely "L" which would immediately move them to list 58 from first H1 heading 34. It is important to note that the efficiency improvement is not simply avoiding unnecessary, repetitive keystrokes. The vast improvement here is that the new screen reader user does not have to wait for audio or Braille "announcement" of each intermediate element along the inefficient path to list 58.

Another feature of the present disclosure is that the graph may represent the application based on how the user interacted with each element on the page through the screen reader hotkeys. Upon the application loading, the digital nudging software may first generate a node to represent each element on the application. As used herein, the term "Elements" refers to any component that may be configured to represent the application. A component may be a list, a paragraph, a heading, a button, a textbox, a link, or any application identifying component known in the art. For ease of reference, the exemplary embodiment described herein uses an element as a heading, but this description should not be interpreted as exclusionary of other elements.

Figure 3:
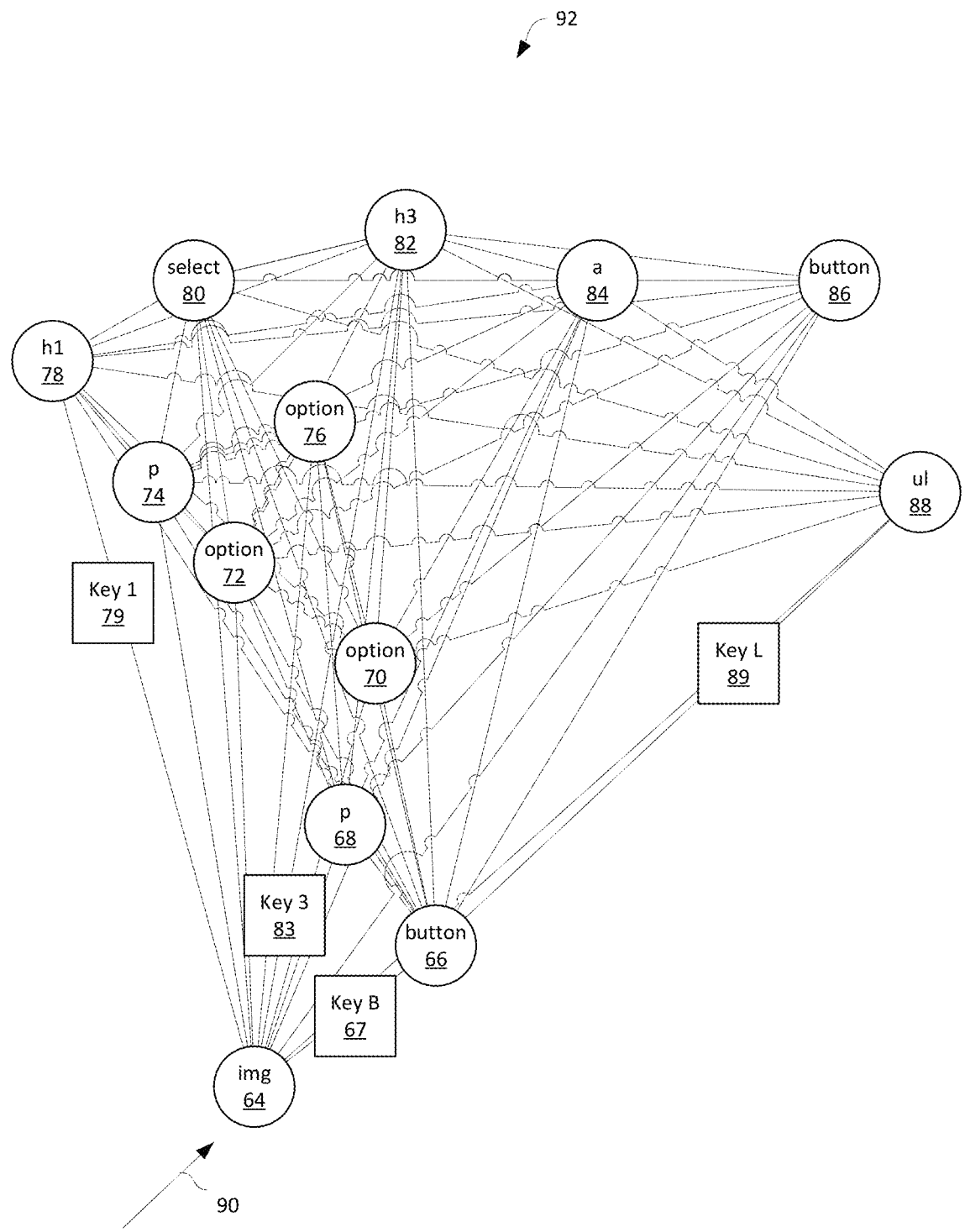
FIG. 3 is a visual representation of a graph-based data structures of a digital nudging software system in which each blue circle is a node that represents an element, and each black line is an edge showing how the nodes are connected via hotkeys, according to an embodiment of the present disclosure.

As shown in FIG. 3, in an embodiment, the elements on graph 92 are then connected to each other through the various screen reader hotkeys, which may be implemented by the user. Additionally, the elements and the screen reader hotkeys may be required to be connected for the digital nudging software to recognize how the user is traveling on the application from component to component. In some embodiments, the connections represented by the screen reader hotkeys may be called an edge and may be marked with the specific screen reader hotkey it represents. For example, at entry 90 of the beginning of the DOM user is on image 64 represented as a node. Other nodes include first button 66, first paragraph 68, first option 70, list 88, second option 72, second paragraph 74, third option 76, H1 heading 78, select control 80, H3 heading 82, hyperlink 84, second button 86 and list 88. Hotkeys to select nodes from image 64 include Key 1 79 which finds the next top-level header, typically denoted as <H1>Title</H1> in the HTML code, Key 3 83 which finds the next third level header, typically denoted as <H3>Subtitle</H3>, Key B 67 which find the next instance of a button control and Key L 89 which finds the next instance of a list.

Furthermore, in an embodiment, the graph may provide information on the shortest path from point A to point B. Through the user interacting with the application, and subsequently the graph, the digital nudging software determines the most efficient screen reader hotkeys for a user. In some embodiments, the digital nudging software may withhold a screen reader hotkey if the path the user takes using the screen reader hotkey is a longer path than the shortest path calculated by the digital nudging software.

In an embodiment, the present disclosure may include a dynamic link library (DLL) hook to access the hotkeys of the application and the focus element of the user prior to implementing a screen reader operating system. Additionally, the DLL may implement a script from the screen reader operating system to determine where the user is on the application every time the focus element changes. In this embodiment, the digital nudging software may identify the user's path through the application along with the hotkeys they are pressing at that exact moment, as the screen reader is running in the background.

Another feature of the present disclosure is that the digital nudging software may determine when the user reached their end destination on the application ("the point A to point B"). In an embodiment, the total time spent on the application by the user was used to identify intent recognition. Accordingly, the digital nudging software used a Gaussian distribution to determine how long the user interacted with each element on the application. The Gaussian distribution begins with a specific pre-set mean and sigma. Once the user interacts with the application for a predetermined amount of time the digital nudging software alters the Gaussian distribution, adapting to the user by changing the mean and sigma distribution.

While calculating the fastest path the user can take through the graph-based representation of the application, the digital nudging software must also prompt the user as necessary once their point B has been detected. In this manner, the graph may be used to calculate what the shortest path for the user would be and if the user had taken that route. In some embodiments, if the user did not take the route calculated by the graph, the digital nudging software may send a notification with a recommendation for a predetermined hotkey. In some embodiments, the digital nudging software may be configured to send a verbalized notification through a screen reader operating system for the screen reader user. Additionally, in an embodiment, the digital nudging software may be configured to condense the notification. In some embodiments, the notification may include, but is not limited to, a visual notification, an audio notification, or a notification known in the art. Furthermore, in some embodiments, after the user interacts with the application and reaches a predetermined endpoint, as identified by a time-based intent recognition programming, the digital nudging software may notify the user of a faster path the user could have taken to get to that same predetermined endpoint and may launch a visual or audio notification relaying that information.

In some embodiments, the audio notification may be configured to be a sound, such that the screen reader user understands the screen reader hotkey has been recommended, and the user may or may not choose to receive the audio notification. In some embodiments, the notification may be presented through two modalities, audio and visual. As soon as the notification is created by a comparator, the alternative path that a user could have taken to get from point A to B is read out loud to them. Meanwhile a visual notification also appears on the screen with the same information. Both the audio and visual notification are launched using multiprocessing or asynchronously so as not to freeze the rest of the application while they are active. A sample audio output which may be used is represented below:

"A faster way to get here is
using the hotkey: 'H' to get from heading to heading"
using the hotkey: 'S' to get to the next same element"
and . . .
"A faster way to get here is
using the hotkey: 'B' to get from button to button"
and . . .
"A faster way to get here is
using the hotkey: 'P' to get from paragraph to paragraph"

Figure 4:
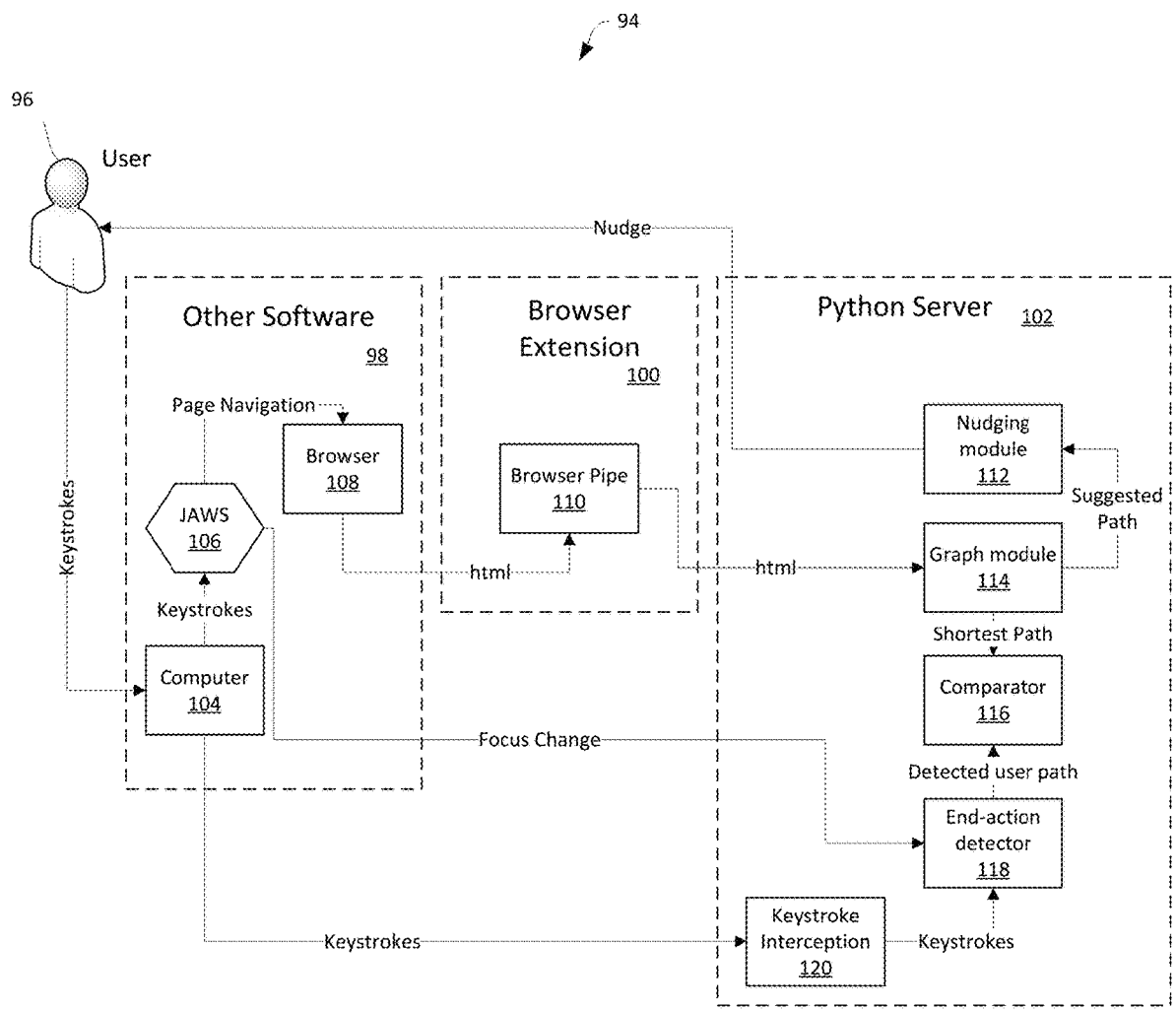
FIG. 4 illustrates an exemplary configuration of a first functional architecture of a digital nudging system, according to an embodiment of the present disclosure.

Next, FIG. 4 depicts an exemplary configuration 94 of a first functional architecture of a digital nudging system, according to an embodiment of the present disclosure. In some embodiments, the first function architecture of the digital nudging software, as shown in FIG. 4, may require the digital nudging software to perform a range of subtasks successfully before the digital nudging software is allowed to provide the notification to the user. The subtasks may include loading and processing the structured representation of an application in order to build the graph, identifying the starting point ("Point A") and the end point ("Point B") of the path of the user, and conveying a notification of the faster paths in a user-friendly format.

In an embodiment, when the digital nudging software beings on a standard programming server 102 (e.g., Python server). Throughout the digital nudging start-up, an End-action detector 118 listens to the screen reader 106 for a focus change event and a hotkey interception module 120 for a new hotkey. The application 98, the hotkey interception module 120, and the screen reader 106 all run in parallel using multi-threading in the programming server 102. Accordingly, when the application 98 is newly loaded, the application 98 sends a request to the programming server 102. The request will then get sent to the graph module 114 where it is used to generate the graph. Next, as the user moves through the application 98 on the path, the path is recorded by the end-action detector 118. An end action is defined as the point to which the user is trying to reach (e.g., the "end point"). When the end point is detected, the End-action detector 118 then sends the detected path to the comparator 116. Finally, the comparator 116 queries the graph module 114 to find the shortest path between the start point of the user and the end point. If the calculated path is shorter than what the user took through the application, then the calculated path is suggested through application hotkeys. In some embodiments, the calculated path is suggested through screen reader hotkeys for screen reader users.

In some embodiments, the end-action detector 118 may start-up the hotkey interception module and the screen reader listener for navigation events. In addition, the end action detector 118 may provide both of these processes with a callback function and run both on individual threads. When the navigation event is detected, the navigation event gets monitored by the end-action detector 118 using an adaptive threshold, created through a Gaussian distribution, to decide whether it is an end point. In some embodiments, If the user interaction on an application is not the end point, the interaction may be added to the list of previous navigation events that represent the path of the user through the application. However, if the navigation event of the user is an end point, then the record of the path of the user is sent to the comparator module 116 to determine if the user had taken the shortest possible path.

As stated above, another feature of the present disclosure is that the digital nudging device may identify where on the application the user is starting their navigation path (point A) and where the user may try to go (point B). In some embodiments, the digital nudging system may provide be configured to represent the navigation path as the graph representation itself. Additionally, in some embodiments, the amount of time a user spent on each element may be used to determine whether the element should be classified as a navigation event. For example, if a user who did not know about the "B" hotkey but was interested in finding a button on the application (e.g., a webpage) then they may be forced to only use the "down arrow" hotkey several times to reach the end point. In that situation the user would likely spend very little time on the elements of the page between their starting point and ending point. Using this logic as motivation, the digital nudging software determines whether the user is interested in an element based on whether the time the user spent on that element has crossed a predetermined threshold.

Figure 5:
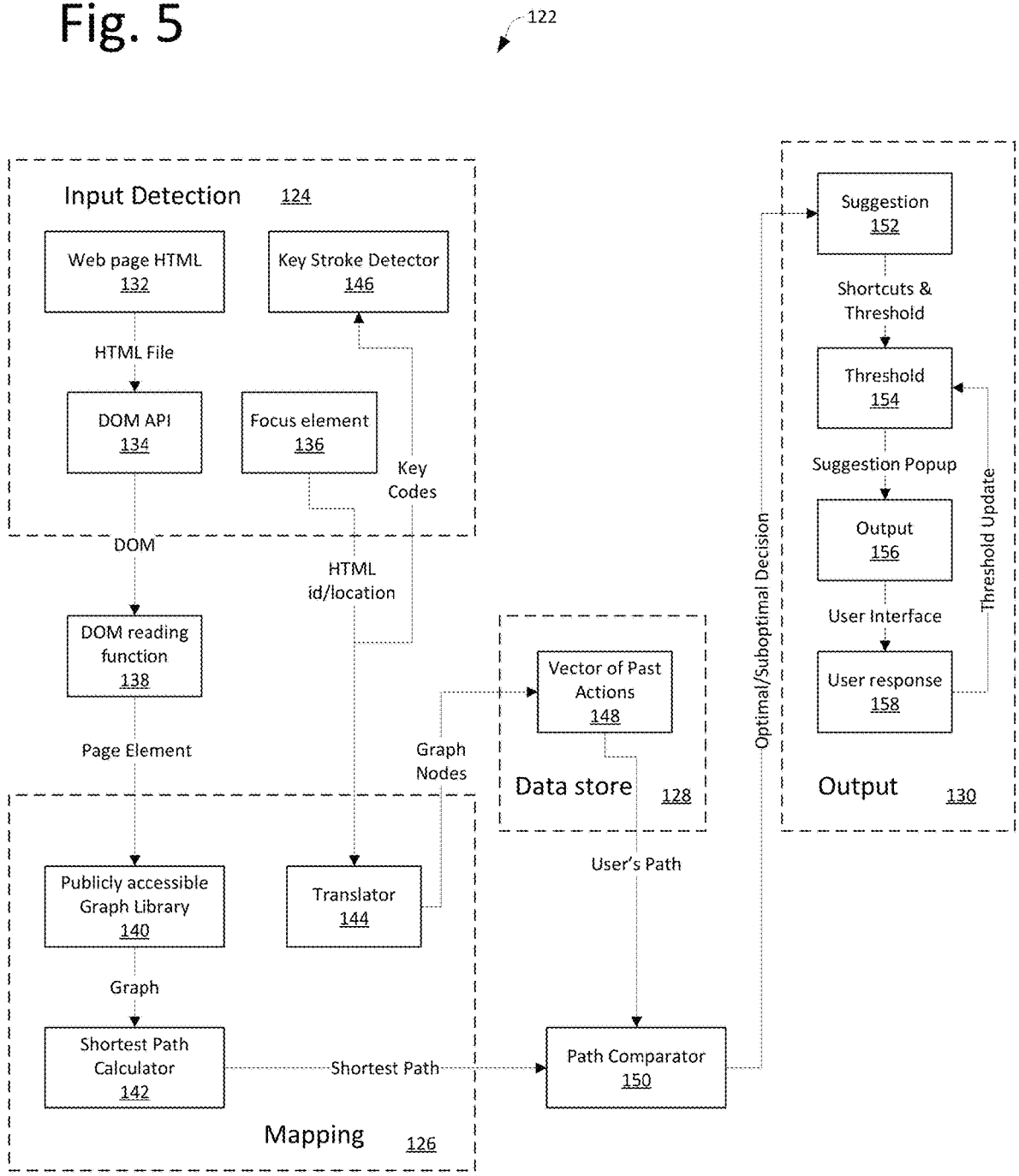
FIG. 5 illustrates an exemplary configuration of a second functional architecture of a digital nudging system, according to an embodiment of the present disclosure.
Figure 6:
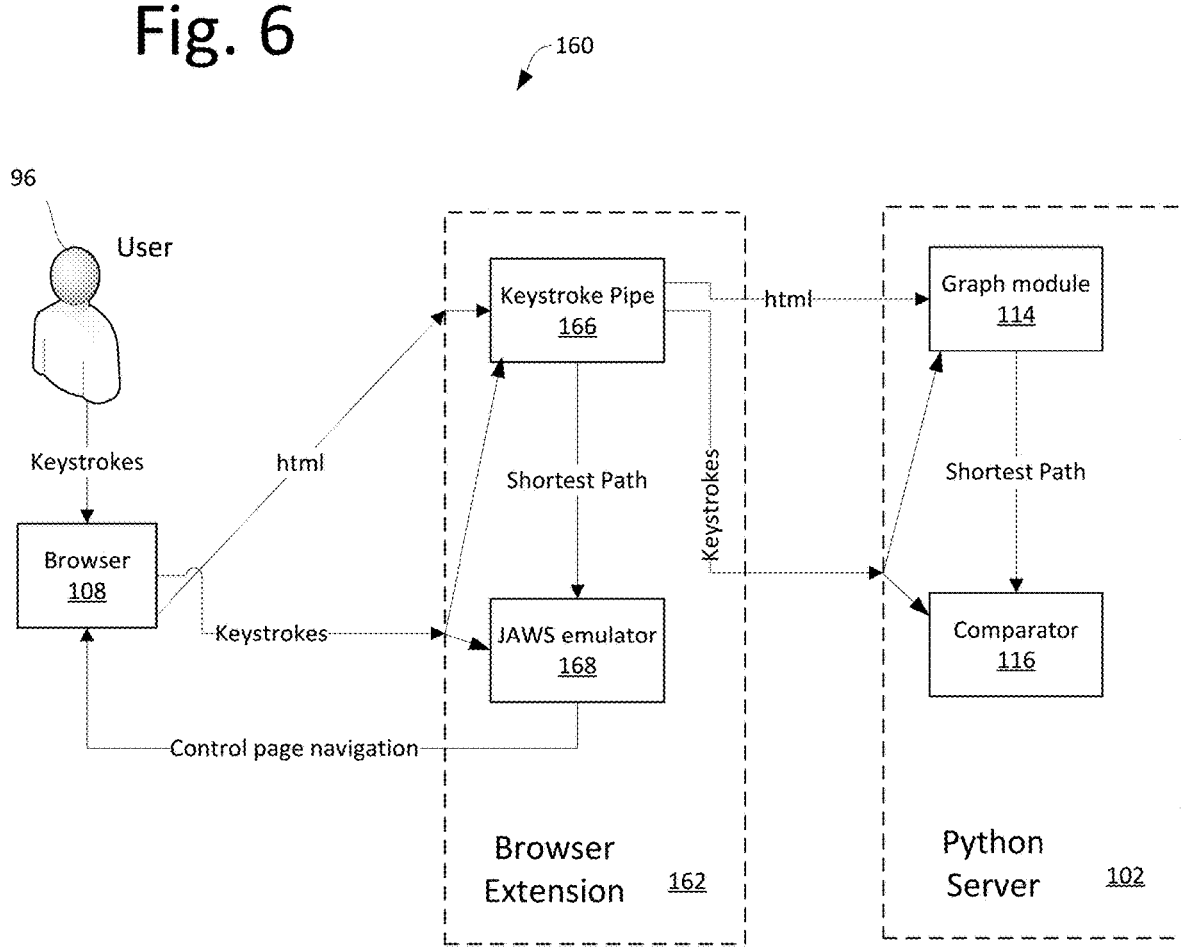
FIG. 6 illustrates an exemplary configuration of a third functional architecture of a digital nudging system, according to an embodiment of the present disclosure.

As shown in FIGS. 5-6, the digital nudge software may comprise alternative functional architecture. FIG. 5 depicts an exemplary configuration of a second functional architecture of a digital nudging system, according to an embodiment of the present disclosure. As shown in FIG. 5, in some embodiments, the digital nudging software may start with a data storage module 128 which is able to create a vector 148 of the actions of the user. Input detection module 124 sends web page HTML 132 to a document object module (DOM) API 134. A DOM reading function 138 returns a page element sent to a mapping module 126. Applying a graph library 140 a shortest path calculator 142 returns the shortest path to path comparator 150. An optimal/suboptimal decision is sent to output module 130 to suggestion component 152 which passes shortcuts and a threshold to threshold component 154. Threshold component passes a suggestion popup to output 156 then to user interface for a user response 158 which interaction is used to update threshold 154. Back at input detection module 124, key stroke detector 146 passes key codes to translator 144 which then passes graph nodes to the vector of past actions 148 in data store 128. The focus element 136 in a user interface is also passed to translator 144 in the form of the HTML id or location.

FIG. 6 depicts an exemplary configuration of a third functional architecture of a digital nudging system, according to an embodiment of the present disclosure. As shown in FIG. 6, in some embodiments, the digital nudging software may have a pseudo screen reader system that replicates the screen reader hotkeys and actions. User 96 makes keystrokes on browser 108. The HTML of the browser 108 is passed to keystroke pipe 166 and the keystrokes themselves are passed to a screen reader emulator 168 embodied in browser extension 162. The server 102 module contains a graphic module component 114 that takes both the HTML and keystrokes to arrive at the shortest path between elements in browser 108 using a comparator 116. The screen reader emulator 168 passes back control page navigation to browser 108.

Another feature of the present disclosure is that the digital nudging software may implement machine learning. The hotkey interception module (i.e., machine learning module) may work in tandem with the screen reader. In an embodiment, the hotkey interception module uses low level application DLL hooks to detect hotkey events at the system level and send the data to the end-action detector. In some embodiments, the hotkey interception module may be to be initialized with a callback function as a parameter and subsequently run on a separate thread to avoid blocking the rest of the screen reader. Whenever a new hotkey is detected, the provided callback function will be triggered with the detected keystroke and time stamp as inputs. Additionally, in some embodiments, the hotkey interception module may also be able to detect specific combinations of hotkeys and automatically label them as being predetermined screen reader combinations for screen reader users.

Figure 7:
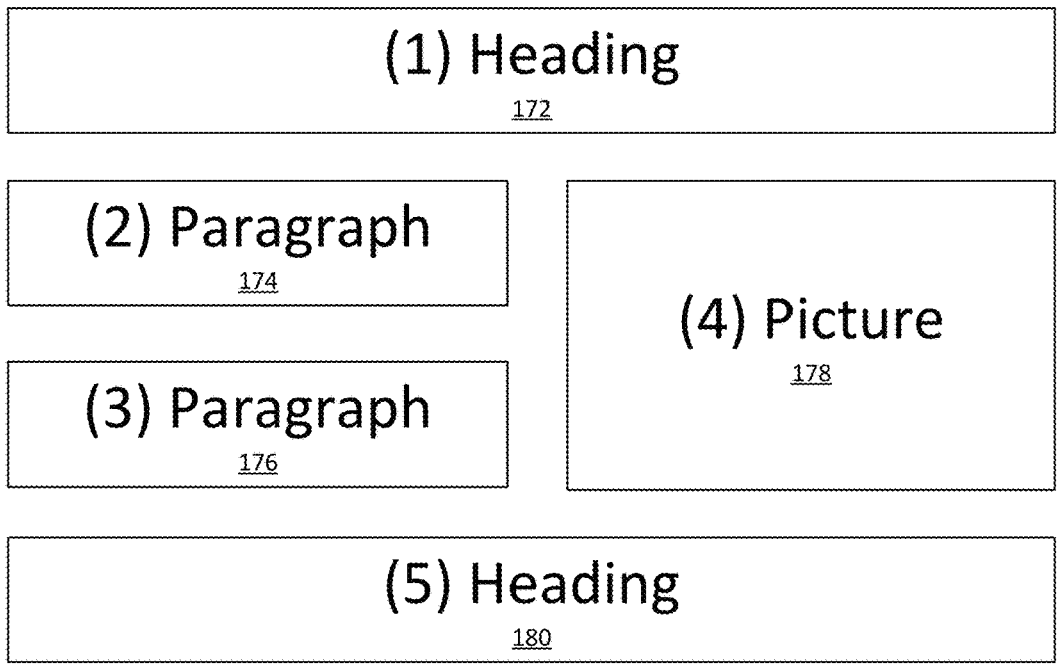
FIG. 7 is an application with elements (paragraphs, headings, picture) with linear order designation.
Figure 8:
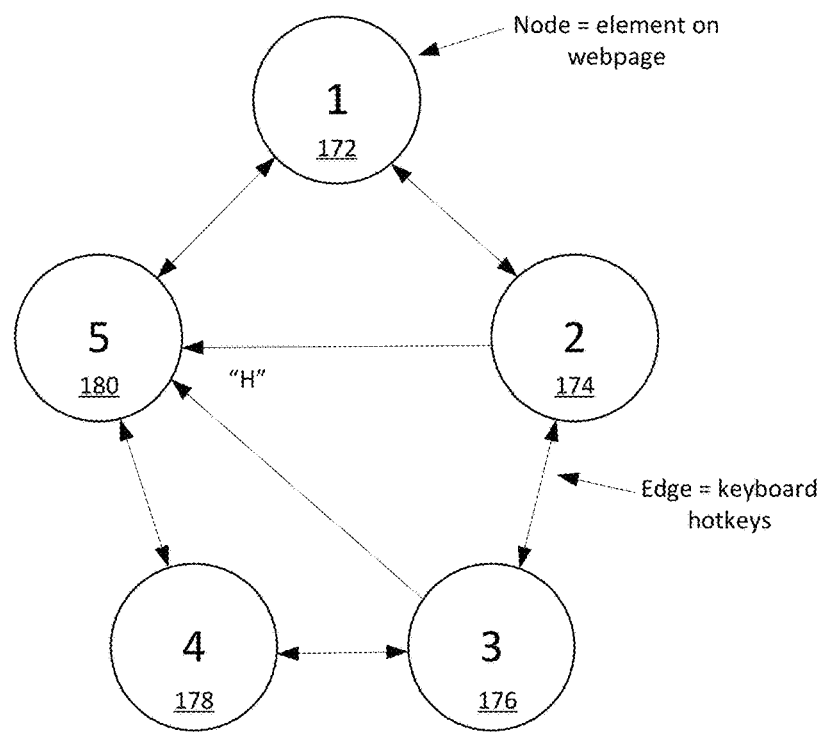
FIG. 8 is a graph-based representation of an application in which a node is an element on the application, for example a paragraph and a heading, while an edge is a screen reader hotkey, as shown in FIG. 7.

As shown in FIGS. 7-8, the digital nudging software is configured to use the graph to represent the path the user can take to navigate an application. The graph is a data structure consisting of nodes and edges and is primarily used to represent the connections between a set of objects. Each element on the computer screen that the user can navigate is comparatively one node on the graph, and each node is connected by edges to all other nodes, such that the user can switch to different nodes through hotkeys. In addition, in some embodiments, the screen reader user may be able to switch to different nodes through screen reader hotkeys. For example, if the user is on an element A, by pressing a key on the computing device (e.g., "down arrow," "h," or "b"), the user would be directed toward another element, "Element B." The node representing element A on the graph would have edges connecting it to the nodes representing element B.

Moreover, FIG. 7 depicts an application represented linearly such that the screen reader interacts with the application. First heading 172 precedes first paragraph 174, second paragraph 176 and picture 178. Following these four elements is second heading 180. In some embodiments, the application must be first linearly represented for an accurate representation of how the screen reader interacts with the application. As shown in FIG. 7, an application (e.g., webpage), with linear order elements, is represented in FIG. 8 as graph-based nodes and edges. As shown in FIG. 8, the arrows in between the elements represent the screen reader hotkeys which the user can press to jump between elements (i.e., nodes). In this manner, node 2 may represent the first paragraph seen in FIG. 7, and by using the key to a computing device, such as a "H" screen reader hotkey, the user may be able to jump all the way down to the next heading, represented as node 5 in FIG. 8.

Next, the speed at which different users navigate applications and the average amount of time they spend on each type of element varies widely. Therefore, in some embodiments, the end-action detection system calculates distinct thresholds for each user and element type based on each user's past usage trends. As previously stated, the end-action detection system models the amount of time a user spends on each type of element with a Gaussian distribution created from preset default values. Then, as the user navigations the application with the screen reader, the amount of time the user spends on each element is used to update that Gaussian distribution. Over time, the Gaussian distribution will become a unique representation of the usage pattern of the user. In some embodiments, to determine whether the user was interested in a certain element the digital nudging software calculates the probability of the user spending at least that much time on that element again. If the probability is low, then it can reasonably be assumed that the user was interested in that element.

TABLE 1

|  | Units | Target |
| --- | --- | --- |
| Graph Generation Time | Seconds | <10 |
| Path Calculation Time | Seconds | <10 |
| Program Memory Space | Gb | <1 |
| Accuracy of End Action Detection | & | >75 |

The equation used to update the stored standard deviation based on each new navigation action taken by the user is as follows:

$$\sigma^2 = \frac{1}{n}\sum x^2 - \left(\frac{1}{n}\sum x\right)^2$$

In the above equation, 'x' represents the time that the user spends on each element. So, the sum of 'x' represents the total sum of all n data points of time the user spent on an element. The equations showing how the stored mean of the time the user spends on each element is calculated is as follows:

$$\frac{x + yn}{n+1}$$

$$\frac{1.1x + yn\left(1 - \frac{.1}{n+1}\right)}{n+1}$$

$$\frac{1.1x + yn\left(1 - \frac{.1}{n}\right)}{n+1}$$

$$\frac{x}{n+1} + \frac{.1x}{n+1} + \frac{yn}{n+1} - \frac{.1yn}{n(n+1)}$$

-continued $$\frac{x}{n+1} + \frac{.1x}{n+1} + \frac{yn}{n+1} - \frac{.1y}{n+1}$$

$$\frac{x+yn}{n+1} + \frac{.1(x-y)}{n+1}$$

The equations, as seen above, have an 'x' variable which represents the time the user spent on the last element and a 'y' variable which represents the average time they spent on all past elements. The first line shows how to calculate the new average using these two values. Additionally, the second line of the equation introduces the multipliers to change the weight given to each element when calculating the new average. The rest of the lines are simplifications of the equation.

Additionally, another feature of the present disclosure is that the digital nudging software may include checkpoints to evaluate the quality of the code. The checkpoints may allow for a reference point as to when and where a problem could arise. In some embodiments, the checkpoints would have estimations of what is expected to occur based on the work breakdown structure, the source line of codes (SLOC), and functional point estimation (FPE). The FPE may allow for the quality requirements to be met through detecting errors in the early phase of the SLOC to reduce effort in the later phases. Additionally, multi-testing strategies allow for multiple types of testing performed so that the digital nudging software may be tested via multiple angles for better quality.

TABLE 2

| Metric | Unit | Acceptance Test | Results |
|---|---|---|---|
| S01. Private identifying or application information is not collected or stored by the digital nudging software | Y/N | Code itself | N |
| S02. User's time completing specific computer tasks decreased after using the digital nudging software | % Difference | User testing | N/A* |
| S03. Amount of data required for training | N/A | Code itself | N/A** |
| S04. How often are users able to understand suggestions | % Difference | User testing | 80% |
| S05. Software generalizes new types of shortcuts | # Shortcuts | Code itself | 12*** |
| S06. Detects all inefficient keystrokes made by the user | % of false positives | User testing | TBD**** |
| S07. Speed of computer | % Difference | Team testing | 0% |
| S08. User rate the system favorably and enjoy interacting with it | x/5 stars | User testing | 5/5 |
| S09. Program size | Gb | Code itself | TBD**** |
| S10. User does not disable digital nudging software (i.e., opt out of use) | Time to disable software (days) | User testing | TBD* |

*This requirement required storing data from the user.
**This requirement was included when the digital nudging software includes the machine learning approach; the digital nudging software does not need data to train the algorithm.
***Because the digital nudging software works with the screen reader, the digital nudging software may detect all the shortcuts that the screen reader utilizes.

Figure 9:
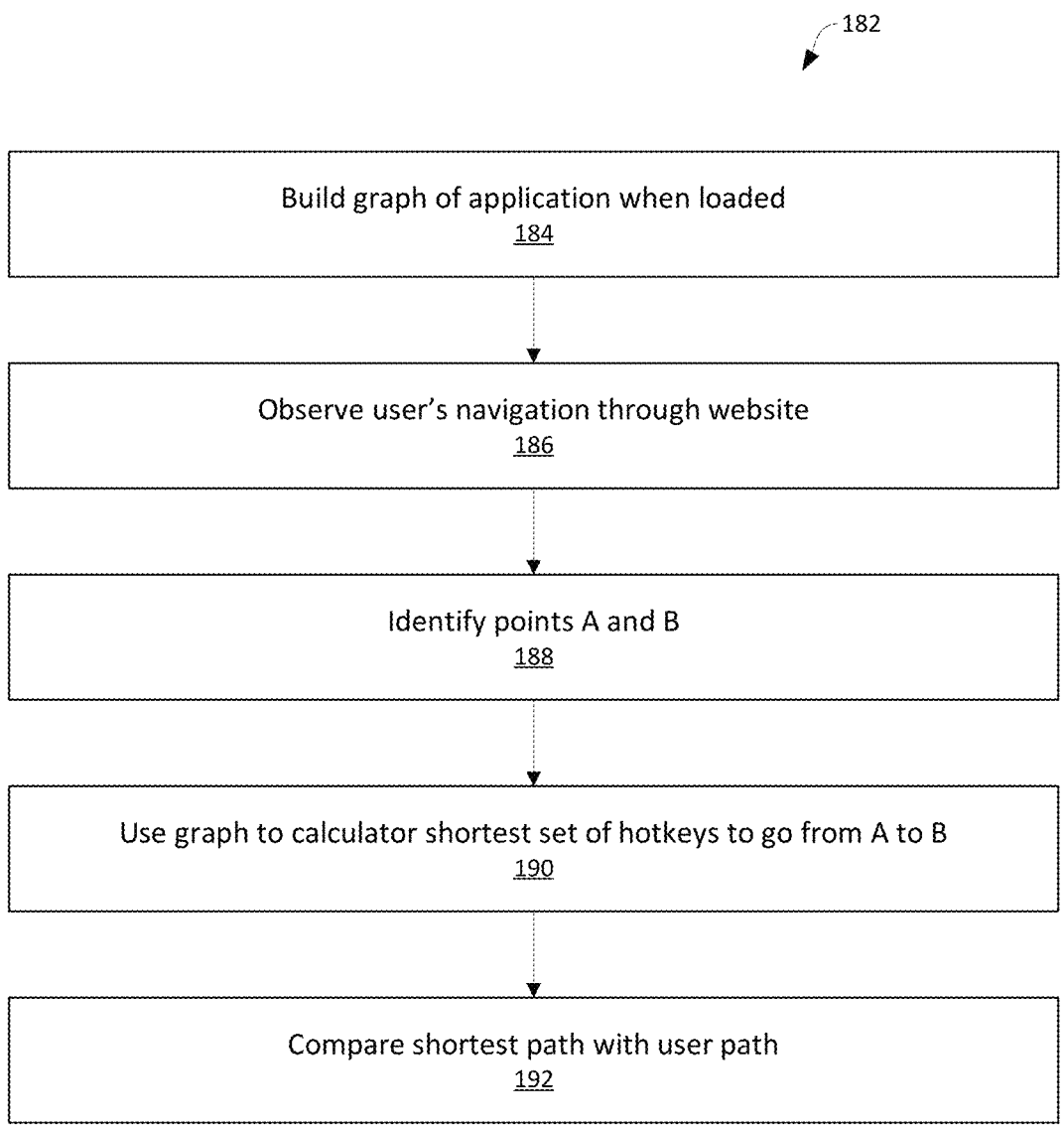
FIG. 9 is a process flow diagram depicting a method of digitally monitoring actions of a user on a computing device and providing real-time suggestions to aid the user's task performance.

FIG. 9 depicts an exemplary process-flow diagram 182 providing a method of digitally monitoring actions of a user on a computing device and providing real-time suggestions to aid the user's task performance. The steps delineated in FIG. 9 are exemplary of an order of modifying notifications of an application. The steps may be carried out in another order, with or without additional steps included therein.

As shown in FIG. 9, the method begins at step 184, in which the graph is built based on the user's navigation of the application. In an embodiment, this step includes a processor of the computing device receiving a selection of navigation preferences and hotkeys, such as from a user of the computing device. The notification preference is then stored within the memory of the digital nudging software, such that the digital nudging software may access the memory prior to verbalizing or visualizing the notification associated with the application on the computing device.

Next, at step 186, the digital nudging software monitors the navigation of the user through an application (e.g., webpage) of the computing device. For example, if the application is a webpage that is executable and launched on the computing device, the processor transmits the navigation events of the user to the end action detector to query the event. Further, at step 188, the digital nudging software identifies the starting point ("Point A) of the user and where the final navigation event ("Point B") of the user. As such, the digital nudging software calculated the navigation and even if the navigation event is not the end point of the user the software adds it to a list of previous navigation points and continues monitoring the user. In some embodiments, the digital nudging software monitors the navigation events or screen reader hotkeys selected by a screen reader user to determine if the screen reader user has reached the end point. Following the digital nudging software calculating the starting point and end point of the user, at step 190 the digital nudging software uses the graph representation to calculate the shortest path between the starting point and end point of the user. Finally, the method then proceeds to step 192, in which the digital nudging software compares the calculated shortest path and the path of the user. If the user did not take the calculated fastest path, then the digital nudging software provides a notification to inform the user of the faster path. In some embodiments, the digital nudging software may provide an audio or visual notification for a screen reader user including, but not limited to a chime, a standardized statement, or a user specific statement.

Additionally, in some embodiments, the most important components of the digital nudging software may be accuracy, speed, and scalability to be the most important components. TABLE 3 demonstrates the digital nudging software examining each element and the weight that was provided to each element by the digital nudging software. As shown in TABLE 3, end action detection was the element that was weighted the most by the digital nudging software.

TABLE 3

| | | Concepts | | | |
|---|---|---|---|---|---|
| Selection Criteria | Weight | Simple Pattern Matching Rating | Keystroke vector Rating | Heuristic Learning Rating | End Action Detection Rating |
| Privacy | 10% | 8 | 8 | 9 | 8 |
| Speed | 20% | 8 | 7 | 4 | 9 |
| Leverage Data | 20% | 8 | 2 | 2 | 5 |
| Accuracy | 30% | 3 | 6 | 9 | 7 |
| Scalability | 20% | 6 | 7 | 8 | 5 |
| Weighted Totals: | | 6.1 | 5.8 | 6.4 | 6.7 |

Glossary of Claim Terms

Comparator: is a program which is configured to use the graph, such that the program queries the graph for the shortest path between the start and end of the path of the user.

Element: is an item on the application that the user can navigate to, such as a header, paragraph, button, or section.

End-Action Detector: is a program comprising a callback function, such that when a navigation event is detected it gets checked using an adaptive threshold to determine whether the event is an end point. If it is not, then it just gets added to the list of previous navigation events that represent the user's current path through the application.

Graph: is a graph-based data structure consisting of nodes that represent items and edges connecting the nodes that represent relationships between the items.

Keyboard: is an input device that allows users to enter data, communicate with the computer, and execute commands through a set of keys arranged in a specific layout. Each key on the keyboard corresponds to a character, number, symbol, or function, such as letters, numerals, punctuation marks, or control keys (e.g., Shift, Ctrl, Alt, Enter, Backspace, and arrow keys). When a user presses a key, the keyboard sends a signal to the computer indicating which key was pressed. The computer's operating system interprets this signal and performs the corresponding action, such as displaying a character on the screen, executing a command, or navigating through the interface.

Keystroke Interception: is a program which uses low level windows dynamic linked library (DLL) hooks to listen to hotkey events at the system level and send the data to the End-Action detector.

Notification Module: is a program responsible for communicating the calculations made by the software to the end user.

Operating System (OS): is a fundamental software that manages computer hardware, software resources, and provides essential services for computer programs to run. It acts as an intermediary between a computer's hardware components and the applications or software used by the user.

Path: is the sequence of elements the user navigates through and hotkeys the user implements to get from one place on the application to another.

Screen Reader Software: is an assistive technology designed to help people who are blind or visually impaired interact with digital content. It converts the text and other on-screen elements into speech or braille, enabling users to navigate, read, and interact with computers, smartphones, and other digital devices. The software works by analyzing the content and structure of a webpage or application and then conveying that information using synthesized speech, a braille display, or both. Screen readers can interpret various elements such as text, images with alternative text, headings, links, buttons, and form fields.

REFERENCES

Weinmann M., Schneider. C., & vom Brocke, J. (2016). Digital nudging. Business & Information Systems Engineering, 58(6), 433-436.

Cristina Mele, Tiziana Russo Spena, Valtteri Kaartemo, Maria Luisa Marzullo, "Smart nudging: How cognitive technologies enable choice architectures for value co-creation," Journal of Business Research, Volume 129, 2021, Pages 949-960, ISSN 0148-2963.

Hackett, S., Parmanto, B., Zeng, X.: Accessibility of Internet web sites through time. In: Proceedings of the Sixth International ACM Conference on Computers and Accessibility, pp. 32-39. ACM Press, Atlanta, GA, USA (2004)

Lazar, J., Beere, P., Greenidge, K., Nagappa, Y.: Web accessibility in the mid-Atlantic United States: a study of 50 home pages. Univers. Access Inf. Soc. 2(4), 1-11 (2003)

Mcmullin, B.: Users with disability need not apply? Web accessibility in Ireland First Monday [Online] Available: http://www.firstmonday.org/issues/issue7_12/mcmullin/ (2002).

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all the generic and specific features of the invention herein described, and all statements of the scope of the invention that, as a matter of language, might be said to fall therebetween.

What is claimed is:

1. A screen reader system for blind and low vision users, the system comprising:

a computing device having a processor and memory for storing instructions for executing an operating system, and a software application running on the operating system;

a keyboard device configured to communicate keyboard combinations by a user, where the software application executes a plurality of events corresponding to the keyboard combinations, the plurality of events including navigating to different points in the software application;

an output device configured to generate notifications to the user in either audio using an audio output device or Braille using a braille display, or a combination thereof;

a digital nudging system operating on a programming server and comprising programmed instructions that when executed cause the programming server to:

receive keyboard combinations communicated by the user at the keyboard device to monitor user interactions with the software application;

identify a starting point and an ending point for navigation within the software application;

identify at least one preexisting keyboard combination that, when entered by the user, completes the same navigation from the starting point to the ending point using a number of user actions that is less than the keyboard combinations used to identify the starting point and ending point of the navigation, where the preexisting keyboard combinations are identified using a graph data structure comprising nodes corresponding to user interface elements displayed in a user interface of the software application and output by the screen reader system, and edges between nodes that correspond to keyboard combinations to navigate from a first user interface element at the starting point to a second user interface element at the ending point;

store user interactions with each user interface elements as a function of time and weighting the graph with a Gaussian distribution to resolve the starting point and the ending point for navigation through the user interface;

generate a nudging notification to communicate to the output device to notify the user of the at least one preexisting keyboard combinations as a more expedient interaction based on the graph data structure; and communicate the nudging notification to the output device to notify the user using audio, Braille, a visual overlay, or a combination thereof.

2. The screen reader system for claim 1 where the screen reader system is initialized with a default Gaussian distribution that is updated based on past usage by the end user.

3. The screen reader system of claim 1, where the programming server is further configured to detect and track the end-user interactions in real-time.

4. The screen reader system of claim 1, where the programming server is further configured to generate the nudging notification in a format and having a content based on user preferences, device capabilities, or context.

5. The screen reader system of claim 1, where the programming server is further configured to provide incremental guidance related to the one or more preexisting keyboard combinations upon user request.

6. The screen reader system of claim 1, where the programming server is further configured to receive and interpret user input from alternate input devices selected from the group consisting of touchscreens, mice, touchpads, microphones, and Braille notetakers.

7. A computer-implemented method for improving end-user efficiency in a software application using a screen reader software for interacting with the software application, the method comprising:

monitoring keystrokes made by a user to achieve a task within the software application;

analyzing the monitored keystrokes, within the screen reader software, using at least one of graph to identify an alternative keystroke combination that performs the same task with fewer user interactions wherein nodes on the graph represent control elements in the software application at a beginning and at an end of the task and edges in the graph represent keystrokes or keystroke combinations to perform the task with fewer user interactions;

utilizing the graph to evaluate and compare the efficiency of the monitored keystrokes with alternative keystroke combinations available within the software application, wherein the graph includes at least one shortest path algorithm, minimum spanning tree algorithm, or traversal method;

generating a nudge notification in a format compatible with the screen reader software to the user from the graph, suggesting the use of the identified alternative keystroke, or keystroke combination for completing the task, where the notification may be presented to the user in an accessible manner, including but not limited to audio, Braille, or visual overlays;

adapting the nudge notification's content, presentation, or timing based on the user's preferences, interaction history, or the specific requirements of the screen reader software;

presenting the nudge notification to the user via an audio output device or a Braille display;

receiving user input and adjusting the user's interaction with the software application based on the user's response to the nudge notification;

updating the graph based on the user's response to the nudge notification and any subsequent changes in their interaction patterns, thereby continuously improving the efficiency recommendations provided to the user; and iteratively refining the efficiency improvement recommendations by monitoring subsequent user interactions and updating the graph based on accumulated user data.

8. A digital nudging system comprising:

a programming server configured to:

run an application on an operating system, a hotkey interception module, and a screen reader in parallel;

generate a graph representation of the application based on a received input request from the application;

identify focus change events from the screen reader and new hotkeys from the hotkey interception module;

record a user's navigation path through the application from the received input request, and identify an end point of the user's navigation path using an adaptive threshold based on a Gaussian distribution;

receive the user's navigation path from the end-action detector and compare with the graph representation of the application to determine the shortest path between a start point and the end point; and provide a nudge notification of an optimized navigation path to the user based on the calculated shortest path if the calculated path is shorter than the user's recorded navigation path, wherein the optimized navigation path is identified through application hotkeys or screen reader hotkeys.

9. The digital nudging system of claim 8 wherein the nudge notification of the optimized navigation path is presented the subsequent instance the user arrives on the start point in the application.

10. The digital nudging system of claim 8 wherein the adaptive threshold based on the Gaussian distribution is a function of the time the user spends on an element in focus at the end point of the user's navigation path versus the average time the user spent on all past elements in the user's navigation path.

11. The digital nudging system of claim 8 wherein the Gaussian distribution is initialized with a preset mean and sigma which are updated based on recorded user interaction with the application.

12. The digital nudging system of claim 11 wherein the Gaussian distribution is updated from timestamp values recorded at each navigation arrival of an element in the application by the user.

* * * * *